US010882943B2

(12) United States Patent
Smits et al.

(10) Patent No.: US 10,882,943 B2
(45) Date of Patent: Jan. 5, 2021

(54) POLYURETHANE

(71) Applicant: Croda International PLC, Yorkshire (GB)

(72) Inventors: Angela Leonarda Maria Smits, Zeist (NL); Wilhelmus Adrianus Jacobus Honcoop, Bergambacht (NL); Remco Benjamin Van Triet, Reeuwijk (NL)

(73) Assignee: Croda International Plc

( * ) Notice: Subject to any disclaimer, the term of this patent is extended or adjusted under 35 U.S.C. 154(b) by 0 days.

(21) Appl. No.: 15/571,328

(22) PCT Filed: May 11, 2016

(86) PCT No.: PCT/GB2016/051336
§ 371 (c)(1),
(2) Date: Nov. 2, 2017

(87) PCT Pub. No.: WO2016/185172
PCT Pub. Date: Nov. 24, 2016

(65) Prior Publication Data
US 2018/0355092 A1  Dec. 13, 2018

(30) Foreign Application Priority Data

May 21, 2015 (GB) .................................. 1508727.3

(51) Int. Cl.
| C08G 18/42 | (2006.01) |
| C08G 18/10 | (2006.01) |
| C08G 18/73 | (2006.01) |
| C08G 18/75 | (2006.01) |
| C09D 175/04 | (2006.01) |
| C08G 18/32 | (2006.01) |
| C09J 175/04 | (2006.01) |
| C08G 18/44 | (2006.01) |
| C08G 18/76 | (2006.01) |
| C08G 18/12 | (2006.01) |
| C08G 18/46 | (2006.01) |
| C08G 18/24 | (2006.01) |

(52) U.S. Cl.
CPC ............ *C08G 18/10* (2013.01); *C08G 18/12* (2013.01); *C08G 18/246* (2013.01); *C08G 18/3203* (2013.01); *C08G 18/3206* (2013.01); *C08G 18/4288* (2013.01); *C08G 18/44* (2013.01); *C08G 18/4615* (2013.01); *C08G 18/73* (2013.01); *C08G 18/755* (2013.01); *C08G 18/758* (2013.01); *C08G 18/7664* (2013.01); *C08G 18/7671* (2013.01); *C09D 175/04* (2013.01); *C09J 175/04* (2013.01)

(58) Field of Classification Search
CPC ........... C08G 18/4615; C08G 18/4288; C08G 18/3206; C08G 18/3203; C08G 18/246; C08G 18/7664; C08G 18/758; C08G 18/7671; C09D 175/04; C09J 175/04
See application file for complete search history.

(56) References Cited

U.S. PATENT DOCUMENTS

| 4,584,229 | A | 4/1986 | Bourelier et al. |
| 4,672,001 | A | 6/1987 | Bravet et al. |
| 4,705,721 | A | 11/1987 | Frisch et al. |
| 4,725,662 | A | 2/1988 | Kuga et al. |
| 5,569,707 | A * | 10/1996 | Blum ................ C08G 18/0819 524/539 |
| 6,566,563 | B1 | 5/2003 | Westfechtel et al. |
| 8,586,697 | B2 | 11/2013 | Elizalde et al. |
| 8,674,017 | B2 | 3/2014 | Ooga et al. |
| 8,987,352 | B1 | 3/2015 | Ou et al. |
| 9,469,789 | B2 | 10/2016 | Sonoda et al. |
| 2005/0143549 | A1* | 6/2005 | Schijndel .............. C08G 18/10 528/44 |
| 2005/0272898 | A1* | 12/2005 | Sasano ..................... B32B 7/12 528/44 |
| 2009/0062551 | A1 | 3/2009 | Tournnilhac et al. |
| 2014/0088245 | A1* | 3/2014 | Singh .................... C08G 18/10 524/590 |
| 2014/0142256 | A1 | 5/2014 | Hoorne-Van Gemert et al. |

(Continued)

FOREIGN PATENT DOCUMENTS

| DE | 19829593 A1 | 1/2000 |
| EP | 1541655 A1 | 6/2005 |

(Continued)

OTHER PUBLICATIONS

International Search Report and Written Opinion for International Application No. PCT/GB2016/051336, dated Jun. 22, 2016—9 Pages.
Garcia, S., "Effect of Polymer Architecture on the Intrinsic Self-healing Character of Polymers", European Polymer Journal, vol. 53, (2014), pp. 118-125.
Third Party Observations for European Application No. 16723453. 3, dated Jul. 25, 2018, 5 pages.
Moses, Paul J., Research Disclosure, 32906 (A), "Process to Repair Scratched Surface of Isoplast Resin," Sep. 10, 1991, 5 pages, Dow Chemical Company.

(Continued)

*Primary Examiner* — Michael L Leonard
(74) *Attorney, Agent, or Firm* — RatnerPrestia

(57) ABSTRACT

The present invention relates to a self-healing polyurethane, a polyol for use in the polyurethane, and to the use of the polyol and/or polyurethane in coatings, elastomers, composites, adhesives and/or sealants. The polyurethane is capable of exhibiting self-healing (for example, intrinsic self-healing) which results in recovery of a proportion of one or more physical parameters. The polyurethane which is capable of self-healing is the reaction product of reactants comprising a polyol, a polyisocyanate; and optionally, a chain extender. The polyol comprises at least one dimer fatty residue; at least one urethane, amide or carbonate group; and at least two hydroxyl end groups.

22 Claims, No Drawings

(56) References Cited

U.S. PATENT DOCUMENTS

| | | |
|---|---|---|
| 2016/0032137 A1 | 2/2016 | Kang et al. |
| 2017/0207427 A1* | 7/2017 | Kouka ................ B32B 15/095 |
| 2017/0342193 A1 | 11/2017 | Nakagawa et al. |
| 2018/0016385 A1 | 1/2018 | Ryu et al. |

FOREIGN PATENT DOCUMENTS

| | | |
|---|---|---|
| JP | 10273514 A | 10/1998 |
| JP | 2000290631 A | 10/2000 |
| JP | 2002519491 A | 7/2002 |
| JP | 2004107640 A | 4/2004 |
| JP | 2006321822 A | 11/2006 |
| JP | 2006324014 A | 11/2006 |
| JP | 2008045036 A | 2/2008 |
| JP | 2012121984 A | 6/2012 |
| JP | 2012121985 A | 6/2012 |
| JP | 2013018805 A | 1/2013 |
| JP | 2015040253 A | 3/2015 |
| JP | 2015071745 A | 4/2015 |
| WO | 2008070762 A1 | 6/2008 |
| WO | 2010084872 A1 | 7/2010 |
| WO | 2012135625 A1 | 10/2012 |
| WO | 2014126741 A2 | 8/2014 |
| WO | 2016025300 A1 | 2/2016 |

OTHER PUBLICATIONS

Notice of Reasons for Refusal for Japanese Application No. 2017-552126, dated Jan. 7, 2020, with translation, 7 pages.

Japanese Notice of Reasons for Refusal for Japanese Application No. 2017-552126, dated Sep. 29, 2020 with translation, 7 pages.

* cited by examiner

POLYURETHANE

CROSS REFERENCE TO RELATED APPLICATIONS

This application is the National Stage filing of International Appln. No. PCT/GB2016/051336, filed 11 May 2016, and claims priority of Great Britain Application No. 1508727.3, filed 21 May 2015, the entirety of which applications is incorporated herein by reference for all purposes.

FIELD OF INVENTION

The present invention relates to a self-healing polyurethane, a polyol for use in the polyurethane, and to the use of the polyol and/or polyurethane in coatings, elastomers, composites, adhesive and/or sealants. The polyurethane is capable of exhibiting self-healing (for example, intrinsic self-healing) which results in recovery of a proportion of one or more physical parameters.

BACKGROUND

Polyurethanes are extremely versatile materials and have been used in a wide variety of applications such as foam insulation, car seats, adhesives, tubing and cabling elastomers, paint coatings and abrasion resistant coatings. Polyurethanes may be used in protective coatings (e.g. to wood, metal, plastic), adhesives to rigid substrates (e.g. composites, metal), adhesives to flexible substrates (textile, plastic film), in applications that require moisture-resistance (e.g. in outdoor use, in sealing, in electronics), and in tough and wear-resistant elastomers.

Polyurethanes are used in a wide variety of forms, for example as dispersions; non-cellular materials such as elastomers; and cellular materials such as low density flexible foams, high density flexible foams, and microcellular foams.

Polyurethane dispersions (PUDs) are used in paint coating compositions. Such coating compositions provide surface protective and/or decorative coatings which may be applied to substrates and allowed to dry or cure to form continuous protective and decorative films. Such coatings may be applied to a wide variety of substrates including metals, wood, plastics, and plaster. Important properties of the formed film include hardness and resistance to water. Waterborne polyurethane dispersions are coatings and adhesives that use water as the primary solvent.

Polyurethane dispersion polymers are an important class of binders for aqueous coating compositions, as they produce excellent properties, such as chemical and stain resistance, hardness and toughness in the solid coating.

Polyurethane elastomers are used in cabling, tubing, belting, sportswear (e.g. sports shoes, goggles, ski boots), films/sheets, automotive interiors (e.g. grips, armrests, consoles) and many other applications.

Polyurethanes, both in dispersion and non-dispersion forms, are also known to find use in adhesives, for example in hotmelt adhesives, moisture-cured adhesives and 2 component reactive adhesives.

Polyurethanes, both in cast thermoset and thermoplastic forms, are known to find use in composites. For example, a polyurethane may be used as a pre-preg matrix, fibre impregnating resin, and as binder resin of composites reinforced with fibres such as carbon, glass or polyester.

Microcellular polyurethane foams have been used for energy absorbing bumper mountings and auxiliary suspension units for wheels, and in particular in shoe soles.

Polyurethane sealants may provide moisture-resistant seals.

SUMMARY OF THE INVENTION

We have now discovered a polyol which allows a polyurethane comprising the polyol to exhibit self-healing properties.

The present invention is based in part on the recognition by the applicant that a self-healing polyurethane may be prepared by the use of a polyol which combines at least one group which is capable of significant hydrogen bonding such as a urethane, amide or carbonate group with a dimer fatty residue which provides flexibility and mobility to the polyol. Without being bound by theory, it is understood that hydrogen bonds may vary in strength from weak to strong, and the selection of urethane, amide or carbonate groups in the polyol is believed to provide hydrogen bonds of sufficient strength and number in the final polyurethane to facilitate a self-healing effect.

A polyurethane system may be characterised as comprising 'harder' segments which are provided by the polyisocyanate and the optional chain extender and 'softer' segments which are provided by the polyol. By the selection of the hydrogen bonding and dimer components of the polyol, the polyol 'soft' segments in the polyurethane may have the ability to balance the flexibility provided by the dimer fatty residue with the ability to hydrogen bond to urethane groups in the 'hard' segments or to other hydrogen bonding polyol segments. Without being bound by theory, this combination may allow the polyurethane to self-heal. The self-healing may occur as a result of a scratch or cut in the polyurethane cleaving more hydrogen bonds than the stronger covalent bonds. The flexibility of the dimer residue in the polyol 'soft' segments will allow the polymer to flow and/or deform to allow some of the cleaved hydrogen bonds to reform which may allow the self-healing to take place under certain conditions. Previously, it may have been undesirable to include a hydrogen bonding capability in the polyol part of a polyurethane since, unless this is combined with dimer flexibility, the additional hydrogen bonding may make the polyurethane too stiff or hard for some applications.

The self-healing may be intrinsic self-healing. In general terms, intrinsic self-healing requires no further external chemical components in addition to the components of the final polyurethane for the polyurethane to exhibit its self-healing effect. However, external energy (such as thermal energy provided by a minimum temperature) may be required for the intrinsic self-healing to be exhibited. Intrinsic self-healing may be contrasted with extrinsic self-healing which requires the presence of further external chemical components (for example encapsulated isocyanate monomer) in addition to the final polyurethane for the self-healing to occur.

Viewed from a first aspect, the present invention provides a polyurethane which is capable of self-healing and which is the reaction product of reactants comprising:
 (A) a polyol, wherein the polyol comprises:
  (i) at least one dimer fatty residue;
  (ii) at least one urethane, amide or carbonate group; and
  (iii) at least two hydroxyl end groups;
 (B) a polyisocyanate; and
 (C) optionally, a chain extender.

Viewed from a second aspect, the present invention provides a polyurethane obtainable by reacting:
 (A) a polyol which is the reaction product of reactants comprising:

(i) at least one of a dimer fatty diacid, a dimer fatty diol, a dimer fatty diamine, or a dimer fatty diisocyanate;

(ii) at least one of a first polyisocyanate, a polyamine, a lactam, a diaryl carbonate, a dialkyl carbonate or phosgene; and (iii) optionally, a non-dimeric diol, a non-dimeric diacid and/or a lactone;

wherein the polyol is capable of forming at least two hydrogen bonds within the polyurethane;

(B) a second polyisocyanate; and (C) optionally, a chain extender;

wherein the polyurethane is capable of self-healing.

Viewed from a third aspect, the present invention provides a coating composition, comprising a polyurethane of the first aspect or second aspect.

Viewed from a fourth aspect, the present invention provides an article comprising a substrate and a coating composition of the third aspect.

Viewed from a fifth aspect, the present invention provides an adhesive, sealant, elastomer or composite composition comprising a polyurethane according to the first aspect or the second aspect.

Viewed from a sixth aspect, the present invention provides an article comprising a substrate and an adhesive composition of the fifth aspect.

Viewed from a seventh aspect, the present invention provides a polyol for a polyurethane of the first or second aspects, wherein the polyol is the reaction product of reactants comprising:

(i) at least one of a dimer fatty diacid, a dimer fatty diol, a dimer fatty diamine, or a dimer fatty diisocyanate;

(ii) at least one of a polyisocyanate, a polyamine, a lactam, a diaryl carbonate, a dialkyl carbonate or phosgene;

(iii) optionally, a non-dimeric diol;

(iv) optionally, a non-dimeric diacid; and (v) optionally, a lactone;

wherein the polyol comprises at least two hydroxyl end groups and comprises at least two internal groups which are capable of hydrogen bonding.

Viewed from an eighth aspect, the present invention provides the use of at least one of a dimer fatty diacid, dimer fatty diol, dimer fatty diamine or dimer fatty diisocyanate in a polyol comprising at least one urethane, carbonate or amide group to provide or improve a self-healing ability of a polyurethane comprising the polyol Any aspect of the invention may include any of the features described herein with regard to that aspect of the invention or any other aspects of the invention.

DETAILED DESCRIPTION OF THE INVENTION

It will be understood that any upper or lower quantity or range limit used herein may be independently combined.

It will be understood that, when describing the number of carbon atoms in a substituent group (e.g. 'C1 to C6'), the number refers to the total number of carbon atoms present in the substituent group, including any present in any branched groups. Additionally, when describing the number of carbon atoms in, for example fatty acids, this refers to the total number of carbon atoms including the one at the carboxylic acid, and any present in any branch groups.

Many of the chemicals which may be used to produce the polyol or polyurethane of the present invention are obtained from natural sources. Such chemicals typically include a mixture of chemical species due to their natural origin. Due to the presence of such mixtures, various parameters defined herein can be an average value and may be non-integral.

The term 'polyol' is well known in the art, and refers to a molecule comprising more than one hydroxyl group. It will be understood that, when describing the polyol it may also comprise one or more primary amine groups instead of hydroxyl groups, which will form urea instead of urethane bonds when reacted with isocyanate. Preferably the polyol comprises at least two hydroxyl end groups. Preferably the polyol does not comprise a primary amine group.

The term 'internal group' will be understood to refer to a functional group of a molecule which is not an end (or terminating) group of the molecule.

The term 'dimer fatty acid' is well known in the art and refers to the dimerisation product of mono- or polyunsaturated fatty acids and/or esters thereof. Dimer fatty acids are described in T. E. Breuer, 'Dimer Acids', in J. I. Kroschwitz (ed.), Kirk-Othmer Encyclopedia of Chemical Technology, 4th Ed., Wiley, New York, 1993, Vol. 8, pp. 223-237. They are prepared by polymerising fatty acids under pressure, and then removing most of the unreacted fatty acid starting materials by distillation. The final product usually contains some small amounts of mono fatty acid and trimer fatty acids, but is mostly made up of dimer fatty acids. The resultant product can be prepared with various proportions of the different fatty acids as desired.

Preferred dimer fatty acids are dimers of C10 to C30, more preferably C12 to C24, particularly C14 to C22, and especially C18 alkyl chains. Suitable dimer fatty acids include the dimerisation products of oleic acid, linoleic acid, linolenic acid, palmitoleic acid, and elaidic acid. The dimerisation products of the unsaturated fatty acid mixtures obtained in the hydrolysis of natural fats and oils, e.g. sunflower oil, soybean oil, olive oil, rapeseed oil, cottonseed oil and tall oil, may also be used. Hydrogenated, for example by using a nickel catalyst, dimer fatty acids may also be employed. Preferably the dimer fatty residues used in the invention are hydrogenated.

In addition to the dimer fatty acids, dimerisation usually results in varying amounts of oligomeric fatty acids (so-called "trimer") and residues of monomeric fatty acids (so-called "monomer"), or esters thereof, being present. The amount of monomer can, for example, be reduced by distillation. Particularly preferred dimer fatty residues, used to form the polyol component of the polyurethane according to the present invention, have a dicarboxylic (or dimer) content of greater than 60%, more preferably greater than 70%, particularly greater than 80%, and especially greater than 90% by weight. The dimer fatty residues may have a dimer content of up to 99.9% by weight. The trimer content is preferably less than 20%, more preferably in the range from 0.1 to 10%, particularly 0.1 to 8%, and especially 0.1 to 6% by weight. The monomer content is preferably less than 10%, more preferably in the range from 0.5 to 5%, particularly 1 to 4%, and especially 2 to 3% by weight. All of the above % by weight values are based on the total weight of trimer, dimer and monomer present.

A dimer fatty diacid (or dimer fatty acid) may be converted to a dimer fatty diol as is known in the art. For example, a dimer fatty diol may be formed by hydrogenation of the corresponding dimer fatty acid. A dimer fatty diol may have properties as described herein with regard to a dimer fatty diacid (or dimer fatty acid) except that the acid groups in the dimer fatty diacid are replaced with hydroxyl groups in the dimer fatty diol. The dimer fatty diol may be hydrogenated. The dimer fatty diol may be non-hydrogenated. In a similar manner, a trimer fatty triacid may be converted to a trimer fatty triol which may have properties as described herein with regard to a trimer fatty triacid. A dimer fatty diol is available ex Croda under the trade name "Pripol 2033".

A dimer fatty diacid (or dimer fatty acid) may be converted to a dimer fatty diamine as is known in the art. A dimer fatty diamine may have properties as described herein with regard to a dimer fatty diacid (or dimer fatty acid) except that the acid groups in the dimer fatty diacid are replaced with amine groups in the dimer fatty diamine. The dimer fatty diamine may be hydrogenated. The dimer fatty diamine may be non-hydrogenated. In a similar manner, a trimer fatty triacid may be converted to a trimer fatty triamine which may have properties as described herein with regard to a trimer fatty triacid. Dimer fatty diamines are available ex Croda under the trade names "Priamine 1074" and "Priamine 1075".

The term 'dimer fatty residue' as used herein, unless otherwise defined, refers to a residue of a dimer fatty acid (also referred to as a dimer fatty diacid) or a residue of a dimer fatty diacid derivative such as a dimer fatty diol, a dimer fatty diamine, a dimer di-isocyanate and/or a dimer diacrylate.

Polyol (A)

Preferably the polyol (A) does not include a reactant monomer which includes 4H unit. A 4H unit is defined as a single functional group which is capable of forming 4 adjacent hydrogen bonds. An example of a 4H unit is a ureidopyrimidinone (UPy). Preferably the polyol does not include ureidopyrimidinone (UPy) or a derivative thereof as a reactant monomer.

Preferably the polyol (A) includes more urethane, amide and/or carbonate groups in total than ester groups. Preferably the polyol (A) includes more urethane, amide and/or carbonate groups in total than ether groups. Preferably the polyol (A) includes more urethane, amide and/or carbonate groups in total than ester and/or ether groups in total. Ester and/or ether groups may be less preferred in the polyol because these groups do not provide the hydrogen bonding required for self-healing. Ester groups provide dipole-dipole bonding which is not as strong as hydrogen bonding. Ether groups cannot form hydrogen bonds with each other.

Preferably the polyol is capable of forming at least two hydrogen bonds within the polyurethane, more preferably at least 3 hydrogen bonds, yet more preferably at least 4 hydrogen bonds. The polyol may be capable of forming at least 5 hydrogen bonds within the polyurethane, preferably at least 6 hydrogen bonds. The polyol may be capable of forming at most 14 hydrogen bonds within the polyurethane, preferably at most 12 hydrogen bonds.

The polyol may comprise at least one urethane group. A urethane group may be capable of forming two hydrogen bonds within the polyurethane. The NH in the urethane group may take part in one hydrogen bond and the C=O in the group may take part in a second hydrogen bond. The polyol may comprise at least two urethane groups, preferably at least three, more preferably at least 4. The polyol may comprise at most 12 urethane groups, preferably at most 10.

The polyol may comprise at least one carbonate group. A carbonate group may be capable of taking part in one hydrogen bond via the C=O in the group. The polyol may comprise at least two carbonate groups, preferably at least three, more preferably at least 4. The polyol may comprise at most 20 carbonate groups, preferably at most 15.

Polycarbonates can be obtained, for example, by reacting diols, such as propylene glycol, butanediol-1,4 or hexanediol-1,6, neopentlyglycol, 3-methylpentanediol, diethylene glycol, triethylene glycol, or tetraethylene glycol, or mixtures of two or more thereof, with dialkyl carbonates (for example, dimethyl carbonate), diaryl carbonates (for example diphenyl carbonate), or phosgene. Ethylene carbonate may be used as a precursor in the preparation of a dialkyl carbonate or a diaryl carbonate.

The polyol may comprise at least one amide group. An amide group may be capable of taking part in two hydrogen bonds. The NH in the amide group may take part in one hydrogen bond and the C=O in the group may take part in a second hydrogen bond. The polyol may comprise at least two amide groups, preferably at least three, more preferably at least 4. The polyol may comprise at most 10 amide groups, preferably at most 8.

The polyol may comprise the reactant(s):
(ii) at least one of a polyisocyanate, a polyamine, a lactam, a diaryl carbonate, a dialkyl carbonate or phosgene.

Reactant (ii) may be present at at least 2 wt %, preferably at least 5 wt %, more preferably at least 10 wt % based on the total weight of the polyol. Reactant (ii) may be present at at most 40 wt %, preferably at most 30 wt %, more preferably at most 20 wt %, yet more preferably at most 15 wt % based on the total weight of the polyol. Preferably reactant (ii) is present at 2 to 20 wt % based on the total weight of the polyol.

Reactant (ii) is preferably at least one of a polyisocyanate, a diaryl carbonate, a dialkyl carbonate or phosgene, more preferably at least one polyisocyanate.

The presence of the dimer fatty residue in the polyol may make it more amorphous, non-crystalline or substantially non-crystalline. The amorphousness may increase the flexibility of the polyol and improve its ability to flow or deform after the polyurethane has been damaged which may allow the polyol to reform hydrogen bonds broken during the damage and therefore provide and/or improve the self-healing ability of the polyurethane.

The polyol may comprise at least 10 wt % dimer fatty residue, preferably at least 20 wt %, more preferably at least 30 wt %, especially preferably at least 40 wt %. The polyol may comprise at most 90 wt % dimer fatty residue, preferably at most 80 wt %, more preferably at most 70 wt %. Preferably the polyol comprises 10 to 80 wt % dimer fatty residue based on the total weight of the polyol. In terms of reactants, preferably the polyol comprises 10 to 80 wt % of dimer fatty diacid, dimer fatty diol, dimer fatty diamine, and/or dimer fatty diisocyanate based on the total weight of the polyol.

Preferably the dimer fatty residue is a dimer diacid residue, a dimer diol residue, a dimer diamine residue, a dimer diisocyanate residue and/or a dimer diacrylate residue. More preferably the dimer fatty residue is a dimer diacid residue, a dimer diol residue, a dimer diamine residue and/or a dimer diisocyanate residue. Yet more preferably the dimer fatty residue is a dimer diacid residue, a dimer diol residue and/or a dimer diamine residue.

Even more preferably the dimer fatty residue is a dimer diacid residue and/or a dimer diol residue. Most preferably the dimer fatty residue is a dimer diol residue.

The polyol (A) may comprise a polyisocyanate as a reactant. The polyisocyanate may be referred to as a first polyisocyanate to distinguish it from a second polyisocyanate (B) which is used to form the final polyurethane. The polyisocyanate may be a diisocyanate. The polyisocyanate may not be aromatic. The polyisocyanate may be aliphatic. The polyisocyanate may be linear. The polyisocyanate may be saturated. The polyisocyanate may include two isocyanate end groups connected by a C4 to C12 alkyl chain, preferably a C4 to C10 alkyl chain, more preferably a C4 to C8 alkyl chain. The alkyl chain may be linear. The polyisocyanate may comprise hexamethylene diisocyanate. An aliphatic polyisocyanate in the polyol may improve the flexibility of the polyol (e.g. when compared with an aromatic polyisocyanate). Improved flexibility in the polyol may improve the self-healing ability of the polyurethane.

The polyol may comprise at least 5 wt % polyisocyanate, preferably at least 10 wt %, more preferably at least 20 wt %, yet more preferably at least 30 wt %. The polyol may comprise at most 60 wt % polyisocyanate, preferably at most 50 wt %, more preferably at most 40 wt %.

The polyol (A) may comprise a polyamine and/or a lactam as a reactant, preferably a polyamine. The polyamine may be a diamine. The polyamine may be aliphatic. The polyamine may be linear. The polyamine may be saturated. The polyamine may include two amine end groups connected by a C4 to C12 alkyl chain, preferably a C4 to C10 alkyl chain, more preferably a C4 to C8 alkyl chain. The alkyl chain may be linear. The polyamine may comprise ethylene diamine, hexane diamine, sebacic diamine, and/or azelaic diamine. The polyol may comprise caprolactam and/or laurolactam as a reactant.

The polyol may comprise at least 5 wt % polyamine, preferably at least 10 wt %, more preferably at least 20 wt %, yet more preferably at least 30 wt %. The polyol may comprise at most 60 wt % polyamine, preferably at most 50 wt %, more preferably at most 40 wt %. The polyol may comprise at least 5 wt % lactam, preferably at least 10 wt %, more preferably at least 20 wt %, yet more preferably at least 30 wt %. The polyol may comprise at most 60 wt % lactam, preferably at most 50 wt %, more preferably at most 40 wt %.

The polyol (A) may comprise a carbonate as a reactant. The carbonate may be a diaryl carbonate, a dialkyl carbonate or phosgene. Preferably the carbonate is a dialkyl carbonate or phosgene. The carbonate may be linear. The carbonate may comprise dimethyl carbonate, diethyl carbonate, dipropyl carbonate, dibutyl carbonate, diphenyl carbonate and/or phosgene.

The polyol may comprise at least 5 wt % carbonate, preferably at least 10 wt %, more preferably at least 20 wt %, yet more preferably at least 30 wt %. The polyol may comprise at most 60 wt % carbonate, preferably at most 50 wt %, more preferably at most 40 wt %.

The polyol (A) may also comprise one or more non-dimeric dicarboxylic acids (hereinafter referred to as non-dimeric diacids). The non-dimeric diacids may be aliphatic or aromatic, and include dicarboxylic acids and their esters, preferably alkyl esters, thereof. Preferably the non-dimeric diacids are linear dicarboxylic acids having terminal carboxyl groups and a connecting carbon chain in the range from 2 to 20, more preferably 6 to 12 carbon atoms. Examples of such non-dimeric diacids are succinic acid, adipic acid, glutaric acid, pimelic acid, suberic acid, azelaic acid, sebacic acid, heptane dicarboxylic acid, octane dicarboxylic acid, nonane dicarboxylic acid, decane dicarboxylic acid, undecane dicarboxylic acid, dodecane dicarboxylic acid and higher homologs thereof. Succinic acid, adipic acid, and/or sebacic acid are particularly preferred.

The polyol may comprise at least 10 wt % non-dimeric diacid, preferably at least 20 wt %. The polyol may comprise at most 40 wt % non-dimeric diacid, preferably at most 30 wt %.

The polyol is preferably formed from dimer fatty residues to non-dimeric diacids at a weight ratio in the range from 10 to 100:0 to 90, more preferably 30 to 70:30 to 70, and particularly 40 to 60:40 to 60.

The polyol may also comprise one or more non-dimeric diols. Suitable non-dimeric diols include straight chain aliphatic diols such as ethylene glycol, diethylene glycol, 1,3-propylene glycol, dipropylene glycol, 1,4-butylene glycol, 1,6-hexylene glycol, branched diols such as neopentyl glycol, 3-methyl pentane glycol, 1,2-propylene glycol, and cyclic diols such as 1,4-bis(hydroxymethyl)cyclohexane and (1,4-cyclohexane-dimethanol). Propanediol, 1,4-butylene glycol, 1,6-hexylene glycol, neopentyl glycol, 3-methyl pentanediol and/or diethylene glycol are preferred diols. Particularly preferred is propanediol.

The polyol may comprise at least 10 wt % non-dimeric diol, preferably at least 20 wt %. The polyol may comprise at most 40 wt % non-dimeric diol, preferably at most 30 wt %.

The polyol may also comprise a lactone as a reactant. An example of a lactone is caprolactone. The polyol may comprise at least 10 wt % lactone, preferably at least 20 wt %. The polyol may comprise at most 40 wt % lactone, preferably at most 30 wt %.

The polyol (A) is preferably formed from non-diol to diol starting materials at a molar ratio in the range from 1:1.0 to 5.0, more preferably 1:1.2 to 3.0, and particularly 1:1.3 to 2.0. The diol may be present in molar excess to obtain a polyol terminated at both ends with OH groups.

In one embodiment, the polyol comprises the reactants dimer diol and a diisocyanate, preferably at a molar ratio in the range from 1 to 5:1, more preferably 1 to 3:1, most preferably 1.2 to 2.0:1.

In one embodiment, the polyol comprises the reactants dimer diol and/or diacid and a carbonate reactant. Preferably the molar ratio of total dimer reactant to carbonate reactant in the polyol is in the range from 1 to 5:1, more preferably 1 to 3:1, most preferably 1.2 to 2.0:1.

The polyol (A) preferably has a molecular weight, particularly a number average molecular weight (for example a number average molecular weight measured as described herein) in the range from 1,000 to 6,000, more preferably 1,200 to 4,000, particularly 1,500 to 3,000, and especially 1,900 to 2,200 g/mol.

The polyol (A) preferably has a glass transition temperature $T_9$ measured by differential scanning calorimetry (DSC) in the range from −55 to +10° C., more preferably −50 to 0° C., more preferably −45 to −10° C., most preferably −45 to −15° C.

The polyol (A) preferably has a hydroxyl value (measured as described herein) in the range from 10 to 150, more preferably 30 to 125, and particularly 40 to 110 mgKOH/g. In addition, the polyester polyol preferably has an acid value (measured as described herein) of less than 2, more preferably less than 1.5, and particularly less than 1.0 mgKOH/g.

Polyurethane

The final polyurethane will typically include a polyol (A), a polyisocyanate or a second polyisocyanate (B) and an optional chain extender (C).

Preferably the polyurethane is not formed as a supramolecular polymer. In other words, the polyurethane preferably comprises a covalently bonded polymer chain and/or does not comprise a supramolecular structure of small monomers and/or oligomers which are joined by multiple H-bonds instead of covalent bonds.

In one embodiment of the invention, the polyisocyanate or second polyisocyanate (B) is reacted with at least polyol (A) to form a prepolymer. The molar ratio of polyisocyanate to polyol starting materials which are mixed together to react to form the prepolymer is preferably in the range from 20 to 80:20 to 80%, more preferably 35 to 75:25 to 65%, particularly 45 to 70:30 to 55%, and especially 55 to 70:30 to 45%. The polyisocyanate is preferably used in molar excess relative to the OH group content of the polyol, so as to obtain an isocyanate-terminated prepolymer and sufficient unreacted polyisocyanate, such that later addition of the chain extender or further polyol can result in reaction to form the final polyurethane, without the requirement for adding further polyisocyanate.

The prepolymer may also be used without the addition of chain extender, by moisture-curing (using atmospheric water, or by introducing water vapour) to form the polyurethane. The prepolymer may also be used in a 2-component system (e.g. as a coating, adhesive, or cast elastomer), by reacting with additional polyol and/or chain extender as a second component.

The prepolymer reaction mixture preferably has an isocyanate content (measured as described herein) in the range from 5 to 30%, more preferably 10 to 25%, particularly 12 to 20%, and especially 14 to 19% NCO.

The polyurethane may be produced by simple mixing of the prepolymer and chain extender, preferably at a NCO/OH ratio in the range from 1.5 to 5:1, more preferably 1.7 to 3:1, and particularly 1.8 to 2:1.

In another embodiment of the invention, the components as described above are reacted in a one-shot instead of two-step process, without making a prepolymer first. The polyols and chain extender are preferably pre-mixed. The polyol plus optional chain extender and polyisocyanate reactants are mixed and reacted in one step.

In a further embodiment of the invention, the polyisocyanate or second polyisocyanate (B) is reacted with at least the polyol (A) to form a polyurethane. The polyol (A) may be combined with a chain extender or a further polyol. This polyurethane may be used for example in polyurethane elastomers, composites, non-reactive hot-melt adhesives and solvent-borne or hot-cast coatings. The polyisocyanate and polyol (plus optional chain extender) are preferable used in close to equimolar ratio to obtain a high molecular weight polyurethane. The molar ratio of polyisocyanate to polyol (plus optional chain extender) is preferably in the range from 0.35 to 0.65:0.65 to 0.35, more preferably 0.4 to 0.6:0.6 to 0.4. For elastomers, more preferably 0.45 to 0.55:0.55 to 0.45, specifically 0.49 to 0.51:0.51 to 0.49. For coatings more preferably 0.4 to 0.5:0.6 to 0.5.

The total polyisocyanate content of the final polyurethane is preferably in the range from 2 to 70 wt %, more preferably 5 to 60 wt %, and particularly 10 to 50 wt %.

The polyol (A) content of the polyurethane is preferably in the range from 10 to 95 wt %, more preferably 20 to 80 wt %, and particularly 30 to 70 wt %.

Polyisocyanate (B) in the Polyurethane

The polyisocyanate or second polyisocyanate (B) used to form the final polyurethane is suitably at least one isocyanate which has a functionality of at least 2. Polyisocyanates used in polyurethanes may be aliphatic isocyanates such as isophorone diisocyanate and hexamethylene diisocyanate, but usually aromatic isocyanates are used such as tolylene diisocyanate, m-phenylene diisocyanate, p-phenylene diisocyanate, xylylene diisocyanate, 4,4'-diphenylmethane diisocyanate (MDI), 2,4'-diphenylmethane diisocyanate, polymethylenepolyphenyl diisocyanate, 3,3'-dimethyl-4,4'-biphenylene diisocyanate, 3,3'-dimethyl-4,4'-diphenylmethane diisocyanate, 3,3-dichloro-4,4'-biphenylene diisocyanate, 1,5-naphthalene diisocyanate, or modified compounds thereof such as hydrogenated MDI (4,4'-Methylenebis(cyclohexyl isocyanate)) and uretonimine-modified compounds thereof. The polyisocyanate monomers can be used alone or as mixtures thereof.

Preferably the polyisocyanate or second polyisocyanate (B) comprises an aromatic polyisocyanate. The aromatic polyisocyanate may be selected from the group consisting of 4,4'-diphenylmethane diisocyanate (MDI), polymethylenepolyphenyl diisocyanate, 3,3'-dimethyl-4,4'-biphenylene diisocyanate, and 3,3'-dimethyl-4,4'-diphenylmethane diisocyanate. Preferably the polyisocyanate or second polyisocyanate (B) comprises MDI.

The polyisocyanate or second polyisocyanate (B) content of the final polyurethane is preferably in the range from 5 to 65 wt %, more preferably 5 to 60 wt %, and particularly 10 to 50 wt %.

Optional Further Polyol(s) in the Polyurethane

The polyurethane may comprise one or more further polyols in addition to the polyol (A) of the invention. The further polyol(s) may comprise at least one of a polyether polyol, a polyester polyol, a polybutadiene polyol, a polycaprolactone polyol, a polycarbonate polyol or a polysulfide polyol.

The weight ratio of further polyol to polyol (A) in the polyurethane may be 90:10 to 0:100, preferably 80:20 to 10:90, more preferably 70:30 to 20:80. This weight ratio may be selected so that sufficient polyol (A) is present to provide the self-healing effect to the polyurethane.

The choice of further polyol, especially the number of reactive hydroxyl groups per polyol molecule and the size and flexibility of its molecular structure may control the degree of cross-linking in the resultant polyurethane. This may allow one or more mechanical properties of the final polyurethane to be selected and/or optimised.

Polyether polyols may be made by the reaction of propylene oxide and/or ethylene oxide with active hydrogen containing starter compounds such as dipropylene glycol, glycerine, sorbitol, sucrose, ethylenediamine and/or triethanolamine. Poly(tetramethylene ether) glycol (PTMEG) is another example of a polyether polyol which may be used.

Polyester polyols are normally made by the polycondensation of multifunctional carboxylic acids and hydroxyl compounds. Conventional polyester polyols are manufactured by the direct polyesterification of high-purity diacids and glycols, such as adipic acid and 1,4-butanediol.

Optional Polyol Compatibiliser

If a mixture of polyols is used, a compatibiliser may be required. Polyol mixtures may have different polarity or different levels of hydrophilic properties, the consequence of these factors being that the components are to some extent immiscible or are mutually miscible only to some extent. Phase separation of these mixtures may lead to problems during use, for example during foaming to give polyurethane foams or during storage of two component adhesives. Compatibility may be improved by making a prepolymer of polyol A first and then add the further polyol or chain extender in a second step. However, this may be not sufficient.

The compatibilisers are therefore used for the compatibilisation or homogenisation of the polyols where these are not readily miscible. The term compatibilisation is used as a term found in the technical literature, although the procedure is similar in principle to homogenization or emulsification. A compatible polyol mixture therefore appears macroscopically to have a single phase. Suitable compatibilisers include silicone surfactants, EO/PO block copolymer surfactants and/or alkoxylate surfactants. The compatibiliser(s) may be present in the polyurethane at 0.05 to 5% wt, preferably 0.1 to 2% wt.

Optional Chain Extender (C)

The chain extender components normally used to form a polyurethane comprise a compound having 2 or more active hydrogen groups, preferably amine or hydroxyl groups. The chain extender may have a low molecular weight, for example a number average molecular weight of 1 to 1000.

Examples of hydroxyl-functional chain extenders are polyols such as ethylene glycol, diethylene glycol, propylene glycol, 1,4-butylene glycol, 1,5-pentylene glycol, methylpentanediol, 1,6-hexylene glycol, neopentyl glycol, 3-methyl pentane glycol, trimethylolpropane, hydroquinone ether alkoxylate, resorcinol ether alkoxylate, glycerol, pentaerythritol, diglycerol, dextrose, and a 1,4:3,6 dianhydrohexitol such as isomannide, isosorbide and isoidide.

Examples of amine-functional chain extenders are:
(i) one or more aliphatic diamines with the number of carbon atoms in the chain of at least 2, whereby the amino groups are preferably at the terminal ends of the carbon chain. The aliphatic diamines may contain up to 20 carbon atoms and the aliphatic chain may be essentially linear or branched. The most preferred aliphatic diamines are 1,2-ethane diamine, 1,4-butane diamine, 1,6-hexamethylene diamine, 1,8-diamino octane or 1,12-diamino dodecane;
(ii) one or more cyclic diamines and/or heterocyclic diamines. Examples for cyclic (aliphatic) diamines or heterocyclic diamines are cyclohexanediamine, 4,4'-diamino-dicyclohexyl-methane, xylenediamine, piperazine, cyclohexanebis(methylamine), isophorone diamine, dimethylpiperazine and dipiperidylpropane, dimer diamines (e.g. Priamine™, ex Croda);
(iii) aromatic polyhydric amines such as methylene-bis(2-chloroaniline), methylenebis(dipropylaniline), diethyl-toluenediamine, trimethylene glycol di-p-aminobenzoate;
(iv) one or more polyoxyalkylene-diamines, for example polyoxyethylene diamine, polyoxypropylenediamine or bis-(di-aminopropyl)-polytetrahydrofurane. The polyoxyalkylenediamines, also known as "Jeffamines" (ex Huntsman), are most preferred; and/or
(v) alkanolamines such as diethanolamine, triethanolamine and diisopropanolamine.

The chain extender may comprise a diamine and/or a diol, preferably a diol. The chain extender may be branched. Preferably the chain extender is a branched diol or diamine. A branched chain extender may improve the flexibility of the 'hard' segment of the polyurethane, which may improve the self-healing ability of the polyurethane. Preferably the chain extender is aliphatic. The chain extender may be saturated. Preferably the chain extender comprises neopentyl glycol, ethyl-hexanediol and/or 3-methyl-1,5-pentanediol. The chain extender may comprise 1,4-butanediol.

The molar ratio of chain extender to the prepolymer employed is preferably in the range from 0.2 to 3:1, more preferably 0.6 to 2.5:1, and particularly 1 to 2:1.

The chain extender content of the polyurethane is preferably in the range from 1 to 20 wt %, more preferably 1.5 to 15 wt %, particularly 2 to 10 wt %, and especially 2.5 to 5 wt %.

The molar ratio of chain extender to isocyanate in the polyurethane is preferably in the range from 0.2 to 5:1, more preferably 0.2 to 3:1, particularly 0.5 to 2:1.

Further Optional Polyurethane Components

In the present invention, the polyurethane composition may optionally contain other additives such as urethane promoting catalysts, surfactants, stabilizers and pigments.

Suitable catalysts are the normal polyurethane catalysts such as compounds of divalent and tetravalent tin, more particularly the dicarboxylates of divalent tin and the dialkyl tin dicarboxylates and dialkoxylates. Examples include dibutyl tin dilaurate, dibutyl tin diacetate, dioctyl tin diacetate, dibutyl tin maleate, tin(II) octoate, tin(II) phenolate, and the acetyl acetonates of divalent and tetravalent tin. In addition, tertiary amines or amidines may also be employed, either alone or in combination with the aforementioned tin compounds. Examples of amines include tetramethyl butane diamine, bis-(dimethylaminoethyl)-ether, 1,4-diazabicyclooctane (DABCO), 1,8-diazabicyclo-(5.4.0)-undecane, 2,2'-dimorpholinodiethyl ether, dimethyl piperazine, and mixtures thereof.

Suitable surfactants include silicone surfactants such as dimethylpolysiloxane, polyoxyalkylene polyol-modified dimethylpolysiloxane and alkylene glycol-modified dimethylpolysiloxane; and anionic surfactants such as fatty acid salts, sulfuric acid ester salts, phosphoric acid ester salts and sulfonates.

Suitable stabilizers include materials which stabilize the viscosity of the polyurethane during its production, storage and application, and include monofunctional carboxylic acid chlorides, monofunctional highly reactive isocyanates, and non-corrosive inorganic acids. Examples of such stabilizers are benzoyl chloride, toluene sulfonyl isocyanate, phosphoric acid or phosphorous acid. In addition, suitable hydrolysis stabilizers include for example the carbodiimide type. Stabilizers which are antioxidants or UV absorbers may also be used. Examples of such stabilizers are HALS hindered amine light stabilisers, hydrogen-donating antioxidants such as hindered phenols and secondary aromatic amines, benzofuranone, oxanilides, benzophenones, benzotriazoles and UV absorbing pigments.

Suitable pigments include inorganic pigments such as transition metal salts; organic pigments such as azo compounds; and carbon powder.

Further additives may include rheology modifiers and/or fillers such as silica and carbonates.

Self-Healing and Physical Properties of the Polyurethane

The self-healing ability of the polyurethane may be demonstrated by comparing a physical parameter of an uncut sample of the polyurethane with a second sample of the polyurethane which has been cut and allowed to heal. The cut surfaces of the second sample demonstrate self-healing over a predetermined period of time at a predetermined temperature. The physical parameter of the second sample is then compared with the uncut sample and may be expressed as a % recovery of the property compared with the uncut sample. A higher % recovery may be taken as an indication of a higher self-healing ability. Preferably, the physical parameter is selected from tensile strength, elongation and/or scratch length.

The polyurethane may exhibit an amount of self-healing at a minimum temperature of at least −10° C., preferably at least 0° C., more preferably at least 10° C., yet more preferably at least 20° C. The polyurethane may exhibit an amount of self-healing at a minimum temperature of at least 30° C., preferably at least 40° C., more preferably at least 50° C., yet more preferably at least 60° C.

The self-healing recovery may occur over 24 hours, 48 hours and/or one week, preferably over 24 hours and/or 48 hours, more preferably over 24 hours.

The self-healing recovery may occur at 20° C., 40° C. and/or 60° C., preferably at 20° C. and/or 60° C. The self-healing recovery may occur at 20° C. The self-healing recovery may occur at 60° C.

The polyurethane may have at least 30% self-healing recovery of a physical parameter when the polyurethane is exposed to a temperature of at least 20° C. for a time of at least 24 hours. Preferably the self-healing recovery is at least 40%, more preferably at least 50%.

The polyurethane may have a self-healing recovery of tensile strength after 24 hours of at least 30%, preferably at least 40%, more preferably at least 50%. The polyurethane may have a self-healing recovery of elongation after 24 hours of at least 30%, preferably at least 40%, more preferably at least 50%, even more preferably at least 60%, yet more preferably at least 70%. The polyurethane may have a self-healing recovery of scratch length after 24 hours of at least 30%, preferably at least 40%, more preferably at least 50%, even more preferably at least 60%, yet more preferably at least 70%.

The polyurethane may have a tensile strength (measured as described herein) of at least 1 MPa, preferably at least 2 MPa, more preferably at least 5 MPa, yet more preferably at least 10 MPa. The polyurethane may have a tensile strength of at most 200 MPa, preferably at most 100 MPa.

The polyurethane may have a self-healing recovery of tensile strength after 24 hours at 60° C. of at least 30%, preferably at least 40%, more preferably at least 50%. The polyurethane may have a self-healing recovery of tensile strength after 24 hours at 60° C. of at least 60% or even at least 70%.

The polyurethane may have an elongation (measured as described herein) of at least 300%, preferably at least 400%, more preferably at least 450%, yet more preferably at least 500%. The polyurethane may have an elongation of at most 1000%, preferably at most 800%, more preferably at most 600%.

The polyurethane may have a self-healing recovery of elongation after 24 hours at 60° C. of at least 30%, preferably at least 40%, more preferably at least 50%, even more preferably at least 60%, yet more preferably at least 70%. The polyurethane may have a self-healing recovery of tensile strength after 24 hours at 60° C. of at least 80% or even at least 90%.

The polyurethane may have a self-healing recovery of scratch length after 24 hours at 20° C. of at least 20%, preferably at least 30%, more preferably at least 40%, even more preferably at least 50%, yet more preferably at least 60%. The polyurethane may have a self-healing recovery of scratch length after 24 hours at 20° C. of at least 70% or even at least 80%.

The polyurethane may exhibit a self-healing recovery after multiple cuts. For example, the polyurethane may exhibit a self-healing recovery after receiving a second cut in the location of a self-healed first cut. After receiving a second cut in the location of a self-healed first cut (with 2 recovery cycles, both of 24 hours at 60° C.), the polyurethane may have a self-healing recovery of at least 30%, preferably at least 40%, more preferably at least 50%, even more preferably at least 60%, yet more preferably at least 70% of a physical parameter. Preferably the physical parameter is selected from tensile strength, elongation and/or scratch length, more preferably tensile strength and/or elongation.

Preferably the polyurethane has at least 30% self-healing recovery of a physical parameter after a first cut and a second cut, wherein the first cut is made and self-healed and the second cut is made at the location of the first cut after it has self-healed.

The polyurethane may have a Shore A hardness (measured as described herein) of at least 25, preferably at least 30, more preferably at least 35, yet more preferably at least 40, even more preferably at least 50. The polyurethane may have an Shore A hardness of at most 100, preferably at most 95, more preferably at most 90.

The polyurethane may have a König hardness (measured as described herein) of at least 10 s, preferably at least 20 s, more preferably at least 30 s, yet more preferably at least 40 s, even more preferably at least 50 s. The polyurethane may have a König hardness of at most 100 s, preferably at most 95 s, more preferably at most 90 s.

The polyurethane described herein may be used in coating, adhesive, sealant, composite and/or elastomer compositions. In particular, the polyurethane may find application in coating compositions, for example in protective coatings. The polyurethane may find application in adhesive compositions, for example in adhesives for electronics and transportation. Types of suitable transportation include automotive, train, bus, aircraft and spacecraft.

The polyurethane may be in the form of a polyurethane dispersion. A polyurethane dispersions according to the present invention may have good thermo-oxidative and UV stability. The polyurethane particles in the dispersion may have an average particle size of 40 nm to 200 nm, preferably 50 nm to 150 nm, more preferably 60 nm to 120 nm when measured by laser correlation spectroscopy using a Malvern Autosizer II from Malvern Instruments Limited. The particle size is determined by dynamic light scattering to obtain an average particle volume measurement which is then converted to a linear particle size assuming spherical particles. Therefore the average particle size is an effective average particle diameter.

Polyurethane in Coatings

A coating composition according to the present invention comprises a polyurethane according to the invention. Protective or decorative coating compositions comprising a polyurethane or polyol according to the invention can be formulated with a wide variety of ingredients well known to those skilled in the art of coating formulation, including solvents, fillers, pigments, pigment dispersing agents, rheology modifiers, thixotropes, flow and leveling aids, defoamers, etc.

Coating compositions of the present invention can be applied by any number of techniques including spray, brush, roller, paint mitt, and the like. Numerous substrates are suitable for application of coatings of this invention with proper surface preparation, as is well understood in the art. Such substrates include, but are not limited to, many types of metal, particularly steel and aluminium, as well as concrete, wood and plastics. An article according to the invention comprises a substrate, preferably a metal substrate; and a coating composition of the invention.

The coating compositions may be suitable for use as a primer coating on substrates such as concrete and/or metal. An overcoat layer may be applied on top of the primer coating.

Coatings of the invention can be applied and cured at ambient temperatures ranging from about 0° C. to about 50° C.

The hardness of a coating formed from the polyurethane may indicate the resistance of the coating to a mechanical force such as pressure, rubbing or scratching. The hardness of a coating composition may be measured by the König hardness. A coating composition comprising the polyurethane may have a König hardness of at least 10 s, preferably at least 20 s, more preferably at least 30 s, even more preferably at least 40 s when measured according to DIN ISO 2815. A coating composition comprising the polyurethane dispersion may have a König hardness of at most 150 s, preferably at most 100 s, when measured according to DIN ISO 2815.

Polyurethane in Elastomers and Composites

In another embodiment, an elastomer or composite according to the invention comprises a polyurethane or polyol of the invention. The elastomer of the invention may be a solid elastomer or a microcellular elastomer, preferably a solid elastomer. The elastomer may be a reinforced elastomer. The reinforced elastomer may comprise reinforcing fibres or fibre mats. The reinforcing fibres may comprise glass fibres, carbon fibres or polyester fibres. The polyurethane elastomer may have improved thermal stability and/or hydrolytic stability in addition to the self-healing capability. A composite comprising the polyurethane of the invention may comprise one or more substrates and/or fibres to which the polyurethane of the invention is applied.

Polyurethane in Adhesives and Sealants

In a further embodiment, an adhesive and/or sealant composition, preferably adhesive composition comprises a polyurethane or polyol of the invention.

The adhesive may be applicable to a suitable substrate, such as wood, metal (steel, aluminium, copper) and plastics or composites, in situ as a free flowing viscous solid, and cured, by reacting with water present in the substrate and/or air humidity, at room or ambient temperature. Adhesives based on the polyurethane of the present invention are for example, used for the lamination of furniture front panels and automotive interior trim parts, and for the bonding of electronics, car parts, windmills, solar panels. An article according to the invention comprises a substrate, preferably a metal or plastic substrate; and an adhesive composition of the invention.

The adhesive preferably has a viscosity at 23° C. in the range from 5 to 80, more preferably 5 to 70, particularly 10 to 70, and especially 10 to 60 Pa·s, measured using a Rheometrics rheometer.

The adhesive may also comprise other optional components such as fillers, for example nylon, glass fibre, fumed silica, wood flour; and other agents such as pigments, antioxidants, stabilizers, flow additives etc.

Any or all of the disclosed features, and/or any or all of the steps of any method or process described, may be used in any aspect of the invention.

EXAMPLES

The invention is illustrated by the following non-limiting examples.

It will be understood that all test procedures and physical parameters described herein have been determined at atmospheric pressure and room temperature (i.e. about 20° C.), unless otherwise stated herein, or unless otherwise stated in the referenced test methods and procedures. All parts and percentages are given by weight unless otherwise stated.

Compounds used in the following Examples are identified as follows:
1,6-Hexamethylene diisocyanate (HDI)
4,4-Methylenebis(phenyl isocyanate) (MDI)
Dicyclohexylmethane diisocyanate (hydrogenated MDI, abbreviated H-MDI)
Isophorone diisocyanate (IPDI)
Pripol™ 2033—hydrogenated C36 dimer diol ex Croda
Priplast™ 3162—polyester polyol containing dimer fatty acid ex Croda
1,4-Butanediol (BDO)
2-Ethyl-1,3-hexanediol (EHD)
Neopentyl glycol (NPG)
1,3-Propanediol (PDO)
1,6-Hexanediol (HDO)
3-Methyl-1,5-pentanediol (MPD)

Test Methods

In this specification, the following test methods have been used:

(i) Tensile strength and elongation were measured according to ISO 527 using an Instron tension tester. The samples were conditioned for 5 days, undeflected and undistorted at 23° C. and 50% relative humidity in a climate room, prior to testing.

(ii) Shore A Hardness was measured according to DIN 53505.

(iii) König hardness was measured according to DIN ISO 2815.

(iv) Number average molecular weight (Mn) was determined by end group analysis with reference to the hydroxyl value.

(v) The isocyanate content is defined as the weight % content of isocyanate in the sample and was determined by reacting with excess dibutylamine, and back titrating with hydrochloric acid.

(vi) The hydroxyl value is defined as the number of mg of potassium hydroxide equivalent to the hydroxyl content of 1 g of sample, and was measured by acetylation followed by hydrolysation of excess acetic anhydride. The acetic acid formed was subsequently titrated with an ethanolic potassium hydroxide solution.

(vii) The acid value is defined as the number of mg of potassium hydroxide required to neutralise the free fatty acids in 1 g of sample, and was measured by direct titration with a standard potassium hydroxide solution.

(viii) Scratch length was measured using a magnifying glass with scale. The scratch was applied in a TQC Buchholtz Hardness Indentation Tester SP1900, by a sharp-edged metal wheel.

Example 1

An HDI and dimer diol polyol was synthesised as follows. 46.13 g Pripol™ 2033 (dimer diol ex Croda) and 11.14 g toluene were added to a plastic beaker. This mixture was stirred and was then placed in an oven at 90° C. Once the mixture was heated, 9.58 g 1,6-Hexamethylene diisocyanate (HDI) was added and the mixture was vigorously stirred. Last, the mixture was placed in the oven at 90° C. overnight. The resulting polyol was found to have a number average molecular weight (Mn) of 2000 g/mol, which was determined by reference to its hydroxyl value.

Example 2

An HDI, dimer diol and non-dimeric diol polyol was synthesised as follows. A 1000 mL 5-necked round bottom flask was equipped with a nitrogen and vacuum inlet, a mechanical stirrer, a cooler and a thermometer. 301.44 g Pripol 2033 was added to the round bottom flask. To remove all water the Pripol 2033 was set under vacuum and the temperature was raised to 115° C. The Pripol 2033 was stirred (100 turns/min) at this temperature for one hour. After cooling the Pripol 2033 to room temperature 5.71 g Neopentyl glycol (NPG) and 80.00 g toluene were added. The stirring speed was increased to 200 turns/min. Then 92.85 g HDI was added and the temperature was gradually increased to 85° C. This mixture reacted for two hours and was then cooled down to room temperature.

Example 3

A polyurethane elastomer was synthesised using the polyol from Example 2. 48.70 g of the polyol from Example 2 and 1.90 g of 1,4-Butanediol (BDO) as chain extender were added to a plastic beaker. This was stirred briefly and was then heated to 90° C. Meanwhile, 9.14 g of 4,4-Methylenebis(phenyl isocyanate) (MDI) as polyisocyanate was weighted and melted at 60° C. Next, the MDI was added to the polyol and chain extender mixture which was then vigorously stirred. Subsequently, the mixture was vigorously shaken under vacuum to remove all air bubbles. The mixture started first to foam and then to bubble. When the viscosity of the mixture increased significantly it was poured into a mold. The polymer was cured at 90° C. overnight.

Example 4

The procedures of Examples 1, 2 and 3 were repeated for various combinations of polyol composition and choice of chain extender. The details of the polyurethane elastomers synthesised are given in Table 1 below.

TABLE 1 details of polyurethane elastomer compositions

| | Soft segment - Polyol composition | | | Hard segment | |
|---|---|---|---|---|---|
| Sample | Polyol mol. wt. (Mn) | Diol component (wt % of polyol) | Diisocyanate component (wt % of polyol) | Chain extender (molar ratio to polyol) | Diisocyanate (molar ratio to polyol) |
| ES1 | 2000 | Pripol (TM) 2033 82.7 wt % | HDI 17.3 wt % | 0.6 EHD | 1.7 MDI |
| ES2 | 2000 | Pripol 2033 73.3 wt % PDO 3.8 wt % | HDI 22.9 wt % | 0.6 EHD | 1.7 MDI |
| ES3 | 2000 | Pripol 2033 75.4 wt % HDO 4.0 wt % | HDI 20.6 wt % | 0.6 EHD | 1.7 MDI |
| ES4 | 2000 | Pripol 2033 74.9 wt % NPG 3.9 wt % | HDI 21.2 wt % | 0.6 EHD | 1.7 MDI |
| ES5 | 2000 | Pripol 2033 74.9 wt % NPG 3.9 wt % | HDI 21.2 wt % | 0.6 MPD | 1.7 MDI |
| ES6 | 2000 | Pripol 2033 82.7 wt % | HDI 17.3 wt % | 0.6 BDO | 1.7 MDI |
| ES7 | 2000 | Pripol 2033 82.7 wt % | HDI 17.3 wt % | 1.5 EHD | 2.6 MDI |

Example 5

The polyurethane elastomers detailed in Table 1 were tested for their self-healing ability. An Instron tensile tester was used to measure tensile strength and elongation of dogbone-shaped samples of the elastomers according to ISO 527. To test the self-healing ability of the elastomers a standard procedure was used to prepare the dogbone samples.

For cut and self-healed dogbones, the dogbones were cut in the middle of their narrow section. The cut parts of the dogbone were then immediately pushed back together manually for two minutes. Next, the cut dogbones were placed in the oven at 60° C. for 24 hours. After, the cut dogbones rested for another 5 days in the climate room at 23° C., before their tensile strength and elongation was measured on the tensile tester to determine the amount of self-healing which had occurred.

To obtain comparative results for dogbones which were not cut, these were also placed in the oven at 60° C. for 24 hours and rested for 5 days at 23° C. before they were tested. Three non-cut and three cut and self-healed dogbones were elongated for each elastomer composition and an average of the results was taken. The results for the non-cut and cut & self-healed dogbones are given in Table 2 below. The tensile strength and elongation results of the cut & self-healed dogbones are given as a percentage of the value of the equivalent non-cut dogbone.

TABLE 2 tensile test results of non-cut and cut & self-healed elastomer samples

| | | Non-cut samples | | Cut & self-healed samples - results are % recovery of value compared to non-cut sample | |
|---|---|---|---|---|---|
| Sample | Shore A Hardness | Tensile Strength (MPa) | Elongation (%) | Tensile Strength (% recovery) | Elongation (% recovery) |
| ES1 | 62 | 3.3 | 536 | 100 | 100 |
| ES2 | 46 | 4.3 | 454 | 73.8 | 95.9 |
| ES3 | 46 | 6.2 | 455 | 53.1 | 92.8 |
| ES4 | 43 | 2.4 | 474 | 42.5 | 90.2 |
| ES5 | 36 | 2.1 | 454 | 91.1 | 95.8 |
| ES6 | 73 | 13.0 | 377 | 10.5 | 15.8 |
| ES7 | 91 | 6.9 | 193 | 16.2 | 8.0 |

Samples ES1 to ES4 demonstrate that various diols can be used in the polyol to obtain a self-healing polyurethane. These polyols are all reacted with 0.6 molar equivalents of EHD and 1.7 molar equivalents of MDI. These polyols vary in composition, having as the diol component only dimer diol (ES1), or replacing 5% by weight of the dimer diol with a non-dimeric diol e.g. 1,3-propanediol (ES2), 1,6-hexanediol (ES3), or neopentyl glycol (ES4). The non-dimeric diols can be used to make variations in mechanical properties such as tensile strength. The resulting polyurethanes remain self-healing to a large extent.

Sample ES5 is based on the same polyol as sample E4, but MPD is used as chain extender in sample ES5, and EHD in sample E4. The use of MPD as chain extender results in a softer polyurethane, and increased the self-healing performance. This may be due to the different branching in MPD compared with EHD providing more flexibility in the hard segment. Sample ES6 is based on the same polyol as sample ES1, but in the polyurethane BDO is used as chain extender in sample ES6, and EHD in sample ES1. The use of BDO results in an increased hardness and stiffness, giving a higher tensile strength, while resulting in a reduction in self-healing recovery. This may be due to the straight chain in BDO providing less flexibility in the hard segment when compared with the branched EHD.

Sample ES7 is based on the same polyol as sample ES1. However, in the polyurethane 1.5 molar equivalents of chain extender EHD and 2.6 molar equivalents of MDI are used in sample ES7, versus 0.5 molar equivalents EHD and 1.6 molar equivalents MDI in sample ES1. The higher amounts of chain extender and isocyanate result in higher hard segment content of the polyurethane, which results in a very hard elastomer. The higher hardness and lower flexibility (lower % elongation at break) resulted in a reduction in self-healing recovery.

Example 6

A polyurethane elastomer was prepared based on a number average molecular weight (Mn) of 2000 g/mol polyol from Pripol 2033 and HDI as in Example 1. The elastomer molar composition was 1 mol polyol:0.6 mol EHD:1.7 mol MDI. Sample ES8 had a Shore A hardness 59, tensile strength 5.0 MPa, and elongation at break 422%. Self-healing performance of sample ES8 was evaluated as in Example 5, where the cut dogbones were placed in the oven at 60° C. for 24 hours. For comparison, the healing temperature was adjusted and cut dogbones were placed in the oven at 40° C. for 24 hours, or were left at 20° C. for 24 hours. The % recovery of mechanical properties for Sample ES8 is given in Table 3.

TABLE 3 self-healing recovery of Sample ES8 at different temperatures

| Healing temperature | Tensile Strength (% recovery) | Elongation (% recovery) |
| --- | --- | --- |
| 20° C. | 17 | 34 |
| 40° C. | 23 | 58 |
| 60° C. | 72 | 99 |

Table 3 shows increasing self-healing as the temperature rises to 60° C.

Example 7

Polyurethane elastomer samples ES3 and ES5 were evaluated for multiple healing performance. After the recovery from the cut as described in Example 5, the self-healed dogbone sample was cut at the same position for a second time and evaluated for healing performance at 60° C. After this second healing cycle, as described in Example 6, tensile performance was evaluated.

a. For Sample ES5, the % recovery after first healing was 91% of tensile strength and 96% of elongation at break. The % recovery after second cut and healing cycle was 90% of tensile strength and 95% of elongation.
b. For Sample ES3, the % recovery after first healing was 53% of tensile strength and 93% of elongation at break. The % recovery after second cut and healing cycle was 16% of tensile strength and 44% of elongation.

Example 8

Polyurethane elastomer sample ES1, which resulted in full (100%) self-healing recovery, was evaluated for different methods of self-healing. In Example 5, the cut parts of the dogbone were pushed back together manually for two minutes.
a. The self-healing evaluation was adjusted, pushing back the cut parts by single touch instead of holding together for two minutes. Again 100% recovery of both tensile strength and elongation were found.
b. The self-healing evaluation was adjusted, pushing back the cut parts after flipping over one part. As such, freshly cut material is pushed back together for two minutes, but the cut materials are not aligned as original. Different polymer chains will touch than in the original dogbone. Again 100% recovery of both tensile strength and elongation were found.

Example 9

An HDI and dimer diol polyol was synthesised as follows. 46.0 g Pripol 2033 (dimer diol ex Croda) was stirred and was then placed in an oven at 90° C. Once the mixture was heated, 5.5 g 1,6-Hexamethylene diisocyanate (HDI) was added and the mixture was vigorously stirred. Last, the mixture was placed in the oven at 90° C. overnight.

Example 10

A polyurethane coating was synthesised using the polyol from Example 9. 10.0 g of the polyol from Example 9 plus 0.5 g 1,4-butanediol chain extender were diluted with 6.67 g butyl acetate solvent and the mixture was stirred using a mechanical stirrer until the polyol was dissolved. Then a few minutes was waited for air bubbles to be released from the mixture. A second mixture was prepared of 3.85 g Desmodur W (dicyclohexylmethane diisocyanate or hydrogenated MDI, abbreviated H-MDI, ex Bayer Material Science) with 2.57 g butyl acetate. To the polyol and chain extender mixture, 10 µl DBTL catalyst was added. Shortly after that, the mixture of isocyanate was added and stirred. A coating was applied onto glass with a thickness of 100 µm, which was dried and cured at 23° C., resulting in a clear coating.

Example 11

The polyol of Example 9 was used with various combinations of chain extender and polyisocyanate to form polyurethane coating samples CS2 to CS10 following the general procedure of Example 10. The amount of isocyanate used was slightly below equimolar ratio to prevent excessive isocyanate reaction with moisture. The details of the polyurethane coatings synthesised are given in Table 4 below. In some formulations, when air release from the polyol mixture was not sufficient, 0.05 g Tego Airex 900 (antifoam agent ex Evonik) was added before adding the isocyanate. These formulations are marked with *.

TABLE 4 details of polyurethane coating compositions

| | | Soft segment | | Hard segment | |
| --- | --- | --- | --- | --- | --- |
| Sample | Polyol mol. wt. (Mn) | Polyol Composition | Polyol amount [grams] | Chain extender [grams] | Diisocyanate [grams] |
| CS1 (comp) | 1000 | Priplast (TM) 3162 polyester polyol | 9.02 g | 1.02 g EDO | 5.10 g H-MDI |
| CS2* | 1100 | Pripol 2033 + HDI | 10.02 g | 0 g | 5.12 g H-MDI |
| CS3* | 920 | Pripol 2033 + HDI | 10.09 g | 0 g | 2.93 g H-MDI |
| CS4* | 920 | Pripol 2033 + HDI | 10.08 g | 0 g | 3.03 g H-MDI |
| CS5* | 920 | Pripol 2033 + HDI | 10.07 g | 0 g | 3.20 g H-MDI |
| CS6 | 1000 | Pripol 2033 + HDI | 9.55 g | 0.54 g BDO | 3.87 g H-MDI |
| CS7 | 1000 | Pripol 2033 + HDI | 10.14 g | 0 g | 2.18 g IPDI |
| CS8* | 920 | Pripol 2033 + HDI | 10.03 g | 0 g | 2.34 g IPDI |
| CS9* | 920 | Pripol 2033 + HDI | 9.02 g | 1.04 g BDO | 4.42 g IPDI |
| CS10 | 920 | Pripol 2033 + HDI | 9.02 g | 1.05 g BDO | 4.40 g IPDI |

Sample CS1 is a comparative Example, not according to the present invention.

Example 12

The self-healing performance of samples CS1 to CS10 was evaluated as follows. Coating hardness was evaluated by measuring the König hardness according to DIN ISO 2815 one week after the coating was applied. Self-healing was evaluated by applying a scratch and measuring initial scratch length, using magnifying glass with scale. The scratch was applied in a TQC Buchholtz Hardness Indentation Tester SP1900, by a sharp-edged metal wheel. The coating was allowed to self-heal at room temperature (20° C.) for different time intervals, after which the scratch length was measured. Samples with self-healing recovery show a significant reduction in the length of the scratch. Results are given in Table 5 below.

TABLE 5 details of polyurethane coatings hardness and scratch healing evaluation

| Sample | König hardness (s) | Initial scratch length (mm) | Scratch length after 1 day (mm) | Scratch recovery after 1 day (%) | Scratch length after 7 days (mm) | Scratch recovery after 7 days (%) |
| --- | --- | --- | --- | --- | --- | --- |
| CS1 (comp) | 27.5 | 0.8 | 0.8 | 0 | 0.8 | 0 |
| CS2 | 61.6 | 1.5 | 1.0 | 33 | 1.0 | 33 |
| CS3 | 15.4 | 1.8 | 1.2 | 33 | 1.0 | 44 |
| CS4 | 16.4 | 1.8 | 0.8 | 56 | 0.5 | 72 |
| CS5 | 16.8 | 1.6 | 0.8 | 50 | 0.4 | 75 |
| CS6 | 82.1 | 1.6 | 0.8 | 50 | 0.4 | 75 |
| CS7 | 22.7 | 1.8 | 0.4 | 78 | 0.2 | 89 |
| CS8 | 15.1 | 2.0 | 1.1 | 45 | 0.8 | 60 |
| CS9 | 46.2 | 1.7 | 0.3 | 82 | 0.2 | 88 |
| CS10 | 54.6 | 1.7 | 0.3 | 82 | 0.3 | 82 |

Comparing sample CS2 with CS1 demonstrates that the coating with the polyol of the invention (CS2) shows self-healing recovery of the scratch, with a 33% reduction of the initial scratch length within one day. The comparative coating (CS1) which is not according to the invention and is based on Priplast 3162 (dimer acid based polyester polyol available ex Croda) does not show self-healing recovery of the scratch. Coating CS2 was formulated with excess of isocyanate, at the same amount of isocyanate by weight as in comparative CS1.

Comparing sample CS3 with CS2 shows that a reduction in the polyol molecular weight from 1100 (CS2) to 920 (CS3), and a reduction in isocyanate content, still results in a self-healing polyurethane coating as shown by CS3. Samples CS3, CS4 and CS5 show an increase in NCO/OH ratio. There is a reduction in scratch recovery at lower NCO (isocyanate) levels, though all three show significant self-healing. The lower NCO level has slightly lower coating hardness as well as lower recovery from the scratch.

Comparing CS6 with CS4 shows that replacement of 5% by weight of polyol with 1,4-butanediol chain extender still results in a self-healing coating.

Comparing CS2 with CS7 shows that self-healing can be obtained with hydrogenated MDI and with Isophorone diisocyanate (IPDI). Coatings based on IPDI resulted in better recovery from the scratching.

Comparing CS8 with CS9 shows that replacement of 10% by weight of polyol with 1,4-butanediol chain extender to enhance coating hardness, still results in a self-healing coating. The self-healing performance was also enhanced by the inclusion of the BDO chain extender.

Comparing CS9 with CS10 shows that the use of antifoam agent did not affect the self-healing behaviour.

Example 13

A polycarbonate polyol was synthesised as follows. A 2000 ml 5-necked round bottom flask was equipped with a nitrogen and vacuum inlet, a mechanical stirrer, a cooler and a thermocouple. 1256.6 g of Pripol 2033 and 0.24 g of sodium methoxide at 30% in methanol (catalyst) were added to the round bottom flask. The stirrer was started and the mixture was heated to 180° C. After applying vacuum (90 mbar) 161.6 g ethylene carbonate was dosed in 1 hour. During the reaction a mixture of ethylene glycol and ethylene carbonate was distilling off. After dosing the reaction went for 1 hr at 180° C. and under vacuum. After raising the vacuum, OH value was determined (OH=99 mgKOH/g) and the dosing procedure was repeated with 89.5 g ethylene carbonate dosed in 1 hour. After reacting for an additional 2 hrs more vacuum was applied (30 mbar) to remove unreacted ethylene carbonate for 2 hrs. Then the product was cooled down to room temperature, obtaining a product with an OH value of 60 mgKOH/g. This OH value corresponds to a polyol having a number average molecular weight (Mn) of about 1870 g/mol.

Example 14

Polyurethane elastomers were prepared based on the polyol from Example 13 using the method of Example 3. As in Example 6, for sample ES9 the elastomer molar composition was 1 mol polyol:0.6 mol END:1.7 mol MDI. Sample ES9 had a Shore A hardness 68. To obtain lower hard segment content, sample ES10 was prepared, where the elastomer molar composition was 1 mol polyol:0.4 mol EHD:1.5 mol MDI. Sample ES10 had a Shore A hardness 55. The Self-healing performance of samples ES9 and ES10 was evaluated following the method of Example 5, where the cut dogbones were placed in the oven at 60° C. for 24 hours. Results are given in Table 6.

TABLE 6 tensile test results of non-cut and cut & self-healed elastomer samples

| Sample | Non-cut samples | | | Cut & self-healed samples - results are % recovery of value compared to non-cut sample | |
|---|---|---|---|---|---|
| | Shore A Hardness | Tensile Strength (MPa) | Elongation (%) | Tensile Strength (% recovery) | Elongation (% recovery) |
| ES9 | 68 | 12.3 | 240 | 14.3 | 11.3 |
| ES10 | 55 | 9.4 | 420 | 38.1 | 46.3 |

It can be seen from Table 6 that Sample ES10 demonstrates that the elastomer with the polycarbonate-polyol of the invention (Example 13) shows self-healing recovery of 38% in strength and 46% in elongation. Comparing samples ES9 and ES10 shows that reduced hard segment content of ES10 resulted in increased self-healing capability. The cut dogbones of Sample ES9 showed only limited recovery after 24 h healing at 60° C.

It is to be understood that the invention is not to be limited to the details of the above embodiments, which are described by way of example only. Many variations are possible.

The invention claimed is:

1. A polyurethane which is capable of self-healing and which is the reaction product of reactants comprising:
   (A) a polyol having a number average molecular weight of 1,000 to 6,000, wherein the polyol comprises:
      (i) at least one dimer fatty residue;
      (ii) at least one urethane group;
      (iii) at least two hydroxyl end groups; and
      (iv) optionally, at least one ester group, wherein the polyol has more urethane groups in total than ester groups;
   (B) a polyisocyanate; and
   (C) optionally, a chain extender.

2. A polyurethane obtained by reacting:
   (A) a polyol having a number average molecular weight of 1,000 to 6,000 and which is the reaction product of reactants comprising:
      (i) at least one of a dimer fatty diacid, a dimer fatty diol, or a dimer fatty diisocyanate;
      (ii) at least one of a first polyisocyanate or a lactam; and
      (iii) optionally, a non-dimeric diol, a non-dimeric diacid and/or a lactone;
   wherein the polyol is capable of forming at least two hydrogen bonds within the polyurethane and has more urethane groups in total than any ester groups that are optionally present;
   (B) a second polyisocyanate; and
   (C) optionally, a chain extender; wherein the polyurethane is capable of self-healing.

3. A polyurethane according to claim 1 wherein the polyol comprises a polyisocyanate reactant which is not an aromatic polyisocyanate.

4. A polyurethane according to claim 1 wherein the polyol comprises a dimer fatty dial reactant.

5. A polyurethane according to claim 1 wherein the polyol is capable of forming at least 3 hydrogen bonds within the polyurethane.

6. A polyurethane according to claim 1 wherein:
   (B) the polyisocyanate or second polyisocyanate comprises an aromatic polyisocyanate.

7. A polyurethane according to claim 1, which comprises a chain extender wherein the chain extender is a branched dial or diamine.

8. A polyurethane according to claim 1 wherein the polyurethane has at least 30% self-healing recovery of a physical parameter when the polyurethane is exposed to a temperature of at least 20° C. for a time of at least 24 hours.

9. A polyurethane according to claim 8 wherein the physical parameter is selected from tensile strength, elongation and/or scratch length.

10. A polyurethane according to claim 1 wherein the polyurethane has at least 30% self-healing recovery of a physical parameter after a first cut and a second cut, wherein the first cut is made and self-healed and the second cut is made at the location of the first cut after it has self-healed.

11. A coating composition comprising a polyurethane according to claim 1.

12. An article comprising:
   a substrate and
   a coating composition according to claim 11.

13. An adhesive, sealant, elastomer or composite composition comprising a polyurethane according to claim 1.

14. An article comprising:
   a substrate; and
   an adhesive composition according to claim 13.

15. A polyurethane according to claim 1, wherein the polyol has a number average molecular weight of 1,200 to 4,000.

16. A polyurethane according to claim 1, wherein the polyol has a number average molecular weight of 1,500 to 3,000.

17. A polyurethane according to claim 1, wherein the polyol has a number average molecular weight of 1,900 to 2,200.

18. A polyurethane according to claim 1, wherein the polyol has a number average molecular weight of 1,000 to 4,000.

19. A polyurethane according to claim 2, wherein the polyol has a number average molecular weight of 1,200 to 4,000.

20. A polyurethane according to claim 2, wherein the polyol has a number average molecular weight of 1,000 to 4,000.

21. A polyurethane according to claim 1 wherein the polyol comprises at least one ester group.

22. A polyurethane according to claim 1, wherein the polyol has no ester groups.

* * * * *

UNITED STATES PATENT AND TRADEMARK OFFICE
CERTIFICATE OF CORRECTION

PATENT NO. : 10,882,943 B2
APPLICATION NO. : 15/571328
DATED : January 5, 2021
INVENTOR(S) : Angela Leonarda Maria Smits et al.

It is certified that error appears in the above-identified patent and that said Letters Patent is hereby corrected as shown below:

In Claim 4, Line 8: "dial" should read --diol--

In Claim 7, Line 18: "dial" should read --diol--

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*